United States Patent Office 3,412,161
Patented Nov. 19, 1968

3,412,161
PREPARATION OF ALKYL CHLORIDES
Pieter M. Bakker and Pieter L. Kooijman, Amsterdam, Netherlands, assignors to Shell Oil Company, New York, N.Y., a corporation of Delaware
No Drawing. Filed Apr. 9, 1965, Ser. No. 447,067
Claims priority, application Netherlands, Aug. 12, 1964, 6409267
9 Claims. (Cl. 260—663)

ABSTRACT OF THE DISCLOSURE

In producing alkyl chlorides by reacting hydrogen chloride with an olefin of eight to twenty carbon atoms, in the presence of a chloride of zinc, iron, titanium or bismuth, the reaction is carried out at 60 to 90° C., in the presence as diluent of sulfolane, an alkyl sulfolane of up to six carbons, a nitroalkane of up to six carbons or a dialkylsulfoxide of up to four carbons.

---

This invention relates to a process for the preparation of alkyl chlorides by the addition of hydrogen chloride to olefins. More particularly, this invention relates to the preparation of alkyl chlorides by the addition of hydrogen chloride to olefins in the presence of a Lewis acid catalyst and an inert immiscible diluent having a dielectric constant higher than 20.

It is known that alkyl chlorides can be prepared by reacting olefins with hydrogen chloride in the presence of zinc chloride. German patent specification 896,940 describes such a process wherein solid zinc chloride is added to a liquid olefin mixture and dispersed in it by thorough stirring. Gaseous hydrogen chloride is subsequently passed through the mixture at a temperature below 100° C. The liquid olefin mixture used in the process of the German patent was a distillate fraction from a technical mixture obtained by catalytic hydrogenation of carbon monoxide. This fraction consisted of 30 percent by volume of $C_{10}$ olefins and 3 percent by volume of $C_7$ alcohols and upon reaction with hydrogen chloride produced both $C_7$ and $C_{10}$ alkyl chlorides.

It has been found that an essential requirement for the formation of alkyl chlorides under the prior art conditions described above is the presence of an alcohol. Thus, in the reaction of dodecene-1 with gaseous hydrogen chloride at 80° C. in the presence of zinc chloride and 2-octanol, dodecyl chloride was prepared in a 45% yield. In the absence of the alcohol no conversion whatsoever occurred. The presence of alcohol is undesirable under the reaction conditions applied in that it reacts with hydrogen chloride with the separation of water, which in turn deactivates the catalyst. Therefore, according to prior art procedure, the activity of the catalyst must be maintained by adding fresh zinc chloride. This process has an additional drawback since the alcohol also reacts to produce the corresponding alkyl chloride. Since the alcohol and olefin do not usually contain the same number of carbon atoms the alkyl chlorides produced must be separated from each other by distillation.

In a variation described in the above-mentioned German patent specification, the addition of hydrogen chloride to olefins can take place in an aqueous solution, preferably containing 60–80% of zinc chloride. It has been found, however, that only certain types of olefins will react under these conditions. Diisobutylene, for example, gave yields of the corresponding chloride of up to 76 percent, while with dodecene-1 only trace quantities of alkyl chloride were found.

It is an object of the present invention to provide a process for the preparation of alkyl chlorides from olefins and hydrogen chloride that does not require the presence of an alcohol.

It is also an object of the present invention to provide a process for the catalytic preparation of alkyl chlorides from olefins and hydrogen chloride that does not result in catalyst deactivation.

It is a further object of the present invention to provide a process for the catalytic preparation of alkyl chlorides by the reaction of hydrogen chloride with an olefin in a two phase system wherein the alkyl chlorides are easily separated from the catalyst. Other objects and advantages of the invention will become apparent from the following detailed description thereof.

It has now been found that the preparation of alkyl chlorides by the addition of hydrogen chloride to olefins under the influence of a Lewis acid catalyst such as zinc chloride or ferric chloride can be substantially improved by carrying out the reaction in the presence of an immiscible, polar organic diluent, whose dielectric constant is higher than 20 and which is inert under reaction conditions.

Examples of such diluents are sulfolane (thiolane-1, 1-dioxide) and lower alkyl homologs thereof containing up to 6 carbon atoms, such as 2-methyl; 3-methyl; 2-ethyl; 2,4-dimethyl and 3,4-dimethylsulfolane; the methyl sulfolanes of up to 6 carbon atoms are preferred alkylsulfolanes. Lower nitroalkanes of up to 6 carbon atoms, preferably from 1 to 4 carbon atoms, such as nitromethane and nitroethane, and lower dialkyl sulfoxides of up to 4 carbon atoms, such as dimethyl sulfoxides may also be used. If desired, other inert diluents or solvents or mixtures thereof may be present.

Diluents with a high dielectric constant have appeared to be particularly suitable and those having a dielectric constant higher than 30 and especially higher than 40 are preferred. To be useful, diluents must be inert under reaction conditions employed; therefore, alcohols, which under reaction conditions react to form alkyl chlorides as explained above, are not suitable for use in the present invention.

Even more important than the dielectric constant is the immiscibility of the diluent with the organic phase which comprises the olefin or the alkyl chloride formed or mixtures thereof. By using a substantially immiscible diluent the reaction can be performed in a two-phase system wherein the upper layer contains the alkyl chloride formed and can be easily separated from the lower layer which contains the catalyst and inert diluent. After separation, the lower layer can be reused with fresh quantities of olefins. It is desirable that the diluent has minimum solubility in the upper organic phase since the diluent must be removed from the reaction product in a subsequent operation. Solubility of the organic phase containing the olefin or alkyl chloride in the lower or diluent phase is less objectionable.

Diluents especially useful consist of sulfolane and its methyl homologs and the lower nitroalkanes. Diluents especially preferred are sulfolane and nitromethane.

The quantity of diluent used is dependent upon the solubility of the catalyst used. In general, one will use at least enough diluent as is necessary to completely dissolve the catalyst. Although its structure is not entirely clear a complex between the diluent and catalyst is probably formed. In order to attain a separation into two phases after the reaction, one will use the quantity of diluent required for this purpose or an excess thereof. If desired, the reaction can be performed using part of the diluent, the balance being added thereafter to the reaction mixture to be separated.

Lewis acids suitable for use as catalysts in the present invention include certain readily hydrolyzable metal chlorides, such as zinc chloride, ferric chloride, titanium tetrachloride and bismuth trichloride. Especially suitable catalysts are zinc chloride and ferric chloride. The amount of catalyst used need not, in general, be larger than 0.25 mole per mole of olefin. High yields are usually obtained when using from about 0.05 to 0.20 mole of catalyst per mole of olefin.

The reaction is preferably carried out under anhydrous conditions. This is important as an excess of water will deactivate the catalyst. Small quantities of water, however, can be tolerated. For example, in certain cases the reaction proceeds in the presence of about 15 percent by weight of water based on the catalyst phase. The activity of the catalyst is, however, much lower and longer reaction times are required. In general, it is desirable to restrict the water content in the catalyst phase to no more than 5 percent by weight.

The starting olefinic material may be either acyclic or cyclic and may be unbranched or branched. If desired the olefins may contain neutral substituents such as halogen atoms, acyloxy and alkoxy groups. Liquid olefins containing from 8 to 20 carbon atoms in the molecule are preferred, with olefins containing from 10 to 18 carbon atoms being especially preferred. In the case of acyclic olefins, the double bond may occupy a terminal or middle position. Also, several, in particular isolated double bonds may be present in the molecule. One may use advantageously olefins obtained by the oligomerization of propylene and/or isobutylene, or which have been formed by cracking paraffinic hydrocarbons, such as solid paraffins, high boiling paraffinic fractions and residues obtained by distillation of mineral oils and distillate fractions of cracked products of high-boiling mineral oil fractions.

Temperatures ranging from about 60° to 90° C. have been found to be particularly suitable; however, higher or lower temperatures are not precluded and are within the scope of the invention. Operation is usually at atmospheric pressure; however, it may be desirable in certain cases to apply super-atmospheric pressures.

After separation of the organic phase containing the alkyl chloride reaction product the catalyst phase can be used again with fresh olefin charge. It is generally not necessary to make up for more than mechanical losses of catalyst or diluent. If necessary one may add sufficient diluent and/or catalyst to make up for any quantities of catalyst deactivated by the presence of moisture. The process of the invention is particularly easy to carry out when a diluent which is not miscible with the olefin-alkyl chloride organic phase is used. The catalyst layer can be readily recovered by phase separation and used repeatedly.

The reaction carried out according to the present invention is substantially complete; therefore, the upper organic phase separated upon completion of the reaction consists of substantially pure alkyl chlorides. After being washed with water and, if necessary, after neutralization, the alkyl chlorides are usually sufficiently pure for further conversion.

The process of the invention can be carried out by bringing a mixture of the Lewis acid catalyst and the diluent to the desired reaction temperature, adding the olefin and passing gaseous hydrogen chloride through the mixture accompanied by vigorous stirring.

It is advantageous to promote the solution of Lewis acid in the diluent with gaseous hydrogen chloride before adding the olefin. However, the order in which the reaction components are added is not critical and the addition can be in different orders. For example, the olefin can be added in one portion or gradually.

The process may be performed batchwise or continuously. In the latter case one can advantageously operate under steady-state conditions. The mixture being discharged can then be passed to a phase separator and separated as described above, after which the separated catalyst-in-diluent phase is recycled to the reaction zone.

The alkyl chlorides prepared according to the invention are important intermediates in the chemical industry. For example, surface active agents suitable as detergents can be prepared by reacting the alkyl chloride with dimethyl amine to form a secondary alkyldimethyl amine which may be oxidized to the corresponding N-oxide, reacted with an alkali metal sulfite to form a sulfonate or hydrolyzed to an alcohol followed by sulfation of the alcohol formed. The alkyl chlorides formed may also be used in the preparation of plasticizers by reaction with phthalic acid salts.

The following examples are illustrative of the present invention but do not limit the scope thereof.

EXAMPLE I

A solution was prepared by dissolving 385 grams of anhydrous zinc chloride in 585 grams of sulfolane while passing in gaseous hydrogen chloride. It was found that 30 grams of hydrogen chloride had been taken up by the solution.

A mixture containing 168 grams of 1-dodecene (1 mole) was added in one portion to 86 grams of the above catalyst solution (0.25 mole of zinc chloride) in a three-necked flask provided with a blade stirrer, a gas inlet tube and thermometer and maintained at 80° C. A gaseous hydrogen chloride stream was introduced into the mixture with vigorous stirring. After 90 minutes the hydrogen chloride absorption was completed. It was found that 39 grams (1.07 moles) of hydrogen chloride had been absorbed. The reaction mixture was transferred at 80° C. to a separatory funnel wherein two phases were formed. The bottom catalyst and diluent layer (84 grams) was separated. The top layer was washed to neutral with water and dried with sodium sulfate and yielded a product consisting of 197.6 grams of dodecyl chloride with a chlorine content of 5.08 milliequivalents per gram. The yield was 100 percent. The product obtained consisted mainly of 2-chlorododecane and contained minor amounts of 3-chloro and other position isomers with the exception of 1-chlorododecane.

EXAMPLE II

The catalyst layer separated from Example I was mixed 162 grams of 1-dodocene and hydrogen chloride as in Example I. The product phase separated from the catalyst contained 190 grams of dodecyl chloride with a chlorine content of 4.60 milliequivalents per gram. The yield was 91 percent.

EXAMPLE III

The conditions of Example I were followed with the exception that only 0.15 mole of zinc chloride per mole of 1-dodecene was used instead of 0.25 mole. After two hours' reaction time a product of dodecyl chloride was obtained representing a 91 percent yield.

EXAMPLE IV

A process similar to that of Example III was followed using ferric chloride instead of zinc chloride as a catalyst. After 45 minutes the product yield of dodecyl chloride was 97 percent.

EXAMPLE V

The process of Example I was again followed using a temperature of 65° C. A product yield of 94 percent was obtained after two hours.

EXAMPLE VI

Nitromethane was used as a diluent instead of sulfolane in the process of Example I. The yield of dodecyl chloride was 96 percent.

EXAMPLE VII

A mixture of isomeric straight chain dodecenes, only 10 percent of which had the double bond in the alpha position were reacted with hydrogen chloride in a sulfolane-zinc chloride mixture as described in Example I. The yield of dodecyl chlorides prepared was 95 percent.

EXAMPLE VIII

A propylene tetramer also containing paraffinic hydrocarbons was used as a starting material in a process similar to Example I. Under these conditions a yield of 82 percent was obtained. In the calculation thereof the feed was regarded as being 100 percent dodecenes.

EXAMPLE IX

The procedure of Example I was again followed using as a starting olefin a $C_{12}$-distillate fraction from a mixture obtained by urea extraction of cracked olefins. Regarding the feed as being 100 percent dodecenes the yield of dodecyl chlorides obtained was 84 percent.

We claim as our invention:

1. In a process for the preparation of alkyl chlorides by the addition of hydrogen chloride to olefins having from eight to twenty carbon atoms in the molecule, in the presence of a catalyst selected from the group consisting of zinc chloride, ferric chloride, titanium tetrachloride and bismuth trichloride, the improvement which comprises carrying out the reaction, at a temperature of from about 60 to about 90° C., in the presence of an immiscible, polar organic diluent whose dielectric constant is greater than 20 and which is inert under reaction conditions selected from the group consisting of sulfolane, alkyl sulfolanes of up to 6 carbon atoms, lower nitroalkanes of up to six carbon atoms and lower dialkylsulfoxides of up to four carbon atoms, whereby two liquid phases are formed, one consisting essentially of the alkyl chloride and the other of the diluent containing the catalyst.

2. A process according to claim 1, wherein the diluent is a methylsulfolane of up to 6 carbon atoms.

3. A process according to claim 1 wherein the diluent is sulfolane.

4. A process according to claim 1 wherein the diluent is nitromethane.

5. A process for the preparation of alkyl chlorides which comprises adding an olefin having from eight to twenty carbon atoms to the molecule to a solution consisting of a catalyst selected from the group consisting of zinc chloride, ferric chloride, titanium tetrachloride and bismuth trichloride dissolved in an inert immiscible diluent selected from the group consisting of sulfolane and nitromethane to form a mixture, adding gaseous hydrogen chloride to said mixture with agitation at a temperature of from about 60 to about 90° C., and allowing the resulting mixture to phase separate, thereby forming an upper liquid phase consisting essentially of alkyl chlorides and a lower liquid phase consisting essentially of the catalyst-diluent solution, and withdrawing said upper phase therefrom.

6. A process according to claim 5, wherein the olefin contains from 8 to 20 carbon atoms and the catalyst is zinc chloride.

7. A process according to claim 6 wherein the olefin is essentially an olefin of 12 carbon atoms.

8. A process according to claim 7 wherein the diluent is sulfolane.

9. A process according to claim 7 wherein the diluent is nitromethane.

References Cited

UNITED STATES PATENTS

| | | | |
|---|---|---|---|
| 2,459,423 | 1/1949 | Gebhart | 260—663 X |
| 2,587,595 | 3/1952 | Cheney et al. | 260—663 X |
| 2,739,990 | 3/1956 | Chipman | 260—663 |
| 2,771,496 | 11/1956 | Hervert | 260—663 X |
| 3,055,954 | 9/1962 | Montagna et al. | 260—663 X |
| 3,115,530 | 12/1963 | Cohen | 260—663 X |

LEON ZITVER, *Primary Examiner.*

T. G. DILLAHUNTY, *Assistant Examiner.*